(12) United States Patent  
Anderson et al.

(10) Patent No.: US 9,142,260 B2  
(45) Date of Patent: Sep. 22, 2015

(54) UNIVERSAL DISK SHIPPER

(75) Inventors: Garry Anderson, Chaska, MN (US); Saiful Hailri, Kuala Terengganu (MY); Gian Ping (Vincent) Chua, Kedah (MY)

(73) Assignee: Entegris, Inc., Billerica, MA (US)

( * ) Notice: Subject to any disclaimer, the term of this patent is extended or adjusted under 35 U.S.C. 154(b) by 323 days.

(21) Appl. No.: 13/510,569

(22) PCT Filed: Nov. 18, 2010

(86) PCT No.: PCT/US2010/057222  
§ 371 (c)(1),  
(2), (4) Date: Aug. 15, 2012

(87) PCT Pub. No.: WO2011/063118  
PCT Pub. Date: May 26, 2011

(65) Prior Publication Data  
US 2013/0001114 A1    Jan. 3, 2013

Related U.S. Application Data

(60) Provisional application No. 61/262,169, filed on Nov. 18, 2009, provisional application No. 61/314,622, filed on Mar. 17, 2010.

(51) Int. Cl.  
*B65D 85/57* (2006.01)  
*G11B 33/04* (2006.01)

(52) U.S. Cl.  
CPC .................................. *G11B 33/0472* (2013.01)

(58) Field of Classification Search  
CPC .................. H01L 21/67383; H01L 21/67369; H01L 21/67386  
USPC .................. 206/711, 710, 832, 833, 454, 449  
See application file for complete search history.

(56) References Cited

U.S. PATENT DOCUMENTS

| | | | | |
|---|---|---|---|---|
| 4,248,346 A | * | 2/1981 | Johnson | 206/711 |
| 4,450,960 A | * | 5/1984 | Johnson | 206/711 |
| 4,520,925 A | * | 6/1985 | Johnson | 206/711 |
| 4,557,382 A | | 12/1985 | Johnson | |
| 4,687,097 A | * | 8/1987 | Mortensen | 211/41.18 |

(Continued)

FOREIGN PATENT DOCUMENTS

| | | |
|---|---|---|
| CN | 1989051 A1 | 6/2007 |
| CN | 201033652 Y | 3/2008 |

(Continued)

*Primary Examiner* — Steven A. Reynolds  
(74) *Attorney, Agent, or Firm* — Christensen Fonder P.A.

(57) ABSTRACT

Systems, methods, and components include an improved universal disk container for use in transporting, storing and processing data storage disks or other disk-shaped articles. A disk shipping system and method for shipping disks allows stocking a minimal number of components while still allowing packaging and shipment of different thickness of disks and different capacities of disks in a container. A universal disk cassette includes slots having a narrowed lower portion configured for handling different disks of the same diameter but different thicknesses while preventing disk to disk contact when the disks are tilted. A universal top cover is configured for cassettes loaded with different thicknesses of disks. The universal top cover can readily accommodate disks that are tilted in the cassette, and with vacuum bagging, more securely fix the disks in place in the container.

13 Claims, 4 Drawing Sheets

(56) References Cited

U.S. PATENT DOCUMENTS

| | | | |
|---|---|---|---|
| 4,718,552 A | 1/1988 | Rossi et al. | |
| 4,779,732 A * | 10/1988 | Boehm et al. | 206/454 |
| 5,046,615 A * | 9/1991 | Nentl et al. | 206/454 |
| 5,253,755 A | 10/1993 | Maenke | |
| 5,273,159 A * | 12/1993 | Gregerson | 206/711 |
| 5,390,811 A | 2/1995 | Ogino et al. | |
| 5,575,394 A * | 11/1996 | Nyseth | 206/710 |
| 5,704,494 A | 1/1998 | Nishikiori et al. | |
| 5,782,361 A * | 7/1998 | Kakizaki et al. | 206/711 |
| 5,850,921 A | 12/1998 | Shindou et al. | |
| 5,964,424 A | 10/1999 | Aoki | |
| 6,003,674 A * | 12/1999 | Brooks | 206/711 |
| 6,427,850 B2 * | 8/2002 | Mendiola | 211/41.18 |
| 6,902,059 B2 | 6/2005 | Whalen et al. | |
| 6,994,217 B2 * | 2/2006 | Duban-Hu et al. | 206/711 |
| 7,175,026 B2 * | 2/2007 | Hachtmann | 206/711 |
| 2003/0029772 A1 * | 2/2003 | Whalen et al. | 206/711 |
| 2003/0205501 A1 * | 11/2003 | Hachtmann | 206/711 |
| 2005/0109665 A1 * | 5/2005 | Duban-Hu et al. | 206/710 |
| 2006/0021896 A1 | 2/2006 | Cleathero et al. | |

FOREIGN PATENT DOCUMENTS

| | | |
|---|---|---|
| JP | 61-49450 U | 8/1984 |
| JP | 05-063066 A | 3/1993 |
| JP | 07-330063 A | 12/1995 |
| JP | 09-002563 A | 1/1997 |
| JP | 09-326146 A | 12/1997 |
| JP | 10-264986 A | 10/1998 |
| JP | 2001-247186 A | 9/2001 |
| JP | 2003-002387 A | 1/2003 |
| KR | 10-0421784 B1 | 2/2004 |
| WO | WO 97/13708 A1 | 4/1997 |
| WO | WO 98/30472 A1 | 7/1998 |
| WO | WO 98/57872 A1 | 12/1998 |
| WO | WO 2006/011609 A1 | 2/2006 |

* cited by examiner

UNIVERSAL DISK SHIPPER

RELATED APPLICATIONS

This application claims priority to U.S. Provisional Application No. 61/262,169, filed Nov. 18, 2009, and U.S. Provisional Application No. 61/314,622, filed Mar. 17, 2010, both of which are incorporated by reference herein.

TECHNICAL FIELD OF THE INVENTION

The present invention relates to packaging and containers for carrying disk-shaped articles, such as data storage disks, substrate wafers, and the like. More particularly, the present invention relates to such a container package with enhanced universality features suitable for modern disk shipping practices.

BACKGROUND OF THE INVENTION

For years, manufacturers have produced special containers for transporting, storing and processing data storage disks, substrate wafers, and the like. The common denominator with such articles is that they are particularly sensitive to contamination and therefore require extraordinary care when handling to avoid such exposure. Although the containers may be provided with cover members for safeguarding the disks from external impurities, a significant threat of contamination arises within the container itself in the form of airborne particulate which may settle on the disks and cause imperfections. Particulates may constitute subminiature fragments of the material used to manufacture the disk cassette and can arise from the abrasion which occurs between the disk cassette and the disks when the disks rotate, rattle, or experience disk tilt within the disk cassette. Main sources of disk rotation, rattle, and tilt include movement of the disk cassette, such as during transportation and handling.

With regard to data storage disks, particulates have the effect of tainting the data storage medium is a quality control issue which results in a reduced ability to store and/or retrieve data.

Conventional disk shippers have a rectangular cassette having an open top and open bottom, elongate sidewalls that converge in at the open bottom, and ends with U-shaped openings extending down from the top edge. A plurality of parallel rib members or teeth extend down the inside surfaces of the sidewalls defining slots therebetween. A top cover attaches over the cassette to close the open top and U-shaped opening on the cassette ends. The top covers conventionally have locators configured as teeth or protrusions extending centrally down the inside of the top cover for individually engaging and constraining and locating each disk in the cassette. Also, it is known that the top cover may also have, polymer strips running parallel to the locators on both sides of the locators. These strips often called anti-clocking ribs or strips, are intended to minimize disk rotation and do not have discrete individual features for engaging individually the disks. See U.S. Pat. No. 4,557,382 and U.S. Pat. No. 6,902, 059, both assigned to the owner of the instant application, for example of such three piece disk shippers, both incorporated by reference herein.

The disk engagement portions in such prior art carriers have difficulty engaging the disks uniformly across the array of disks. Particularly spring supported teeth such as illustrated in U.S. Pat. No. 5,253,755 owned by the owner of the instant application. The top cover being latched at its ends tends to bow outwardly in the middle of the top cover providing the disks in the middle of the carrier less downward constraint that the disks near the ends. It would be advantageous to correct this non-uniformity of disk engagement by the top cover.

Disks shipped in these shippers now have different standardized thicknesses, in particular, 0.025, 0.0315, 0.040, 0.050, 0.069 inches are now in use. Conventional commercially available cassettes are configured for carrying a single size of disk, both diametrically and with respect to thickness. Attempts to insert a thicker disk in a carrier designed for a thinner disk, for example a 0.050 inch disk in a carrier designed for a 0.0315 inch disk will, at least, likely result in damage to the disk and will create difficulty removing the disk.

Similarly, putting a thinner disk in a conventional cassette designed for a larger disk will typically allow excessive misalignment resulting in potential disk damage and particulate generation as well as difficulty installing the top cover. Such damage to the disks can occur, for example, by contact between adjacent disks and disk tilting and rattling. The tilting and rattle also causes particulate generation. In that conventional locators on the top cover are configured for a specific thickness of disk, tilted disks may miss the disk edge receiving region on the locators when a conventional top cover is installed causing disk damage and/or particulate generation, as well as difficulty installing the top cover.

The length of cassettes, and correspondingly the disk shippers has been standardized, in that equipment at manufacturing facilities is designed to accommodate the particular sized cassettes. Manufacturers have been adding more slots with less distance between the disks to allow a particular size, lengthwise, of cassettes to ship more disks, this is particularly true for the thinner disks. Exteriorly, the cassettes are the same, however, the interior differs with a higher density of slots, correspondingly with less spacing or pitch between adjacent slots. Typically, a different cassette, and a different top cover is needed for each size (thickness) of disks and, of course, for different capacities, and certainly for different diametric sizes. Such complexities can cause inventory and part selection issues, e.g., which top cover to use for a certain disk thickness, or certain capacity carrier, when the disks are packaged and shipped.

The components for these shippers are manufactured by injection molding polymers, often polycarbonate for the cassette, and polyethylene or other polymers for the top cover and bottom cover. When different arrangements of top cover locators are needed to accommodate the different numbers of disks, and the different thickness, expensive tooling is needed for each arrangement. That is the steel molds, or different inserts for the molds need to be created to handle the array of combinations of capacities and thicknesses. To the extent a particular design of a cassette or top cover can provide for less plastic resin, this advantageous from a cost perspective as well as environmentally.

It is now common in shipping disks in such containers to vacuum wrap the loaded disk shipper in a metalized bag and then a further secondary polyethylene vacuum bag.

Disk shipping containers are or have been designed and built to support each specific diametric disk size including disks sizes of 48 mm, 54 mm, 65 mm, 70 mm, 84 mm, and 95 mm diameters and thicknesses of; 0.069 inches (1.75 mm), 0.050 inches (1.27 mm), 0.040 inches (1.02 mm), 0.0315 inches (0.8 mm), and 0.025 inches (0.635 mm). To the extent more universality is provided in cassettes and top covers, more variety in flexibility in shipping options may be offered at less expense.

A need therefore exists for an improved disk shipper components that provide more universality whilst still addressing the issues of particulates, contaminants, and minimizing damage to the disks being shipped, as well as a need to minimize manufacturing costs, including injection molding tooling, a need to be environmentally friendlier to the environment. The inventions herein address the aforementioned. Such a disk shipper should take advantage of the now common place practice of vacuum bagging disk shippers.

SUMMARY OF THE INVENTION

Embodiments of the invention are an improved disk container for use in transporting, storing and processing data storage disks or other disk-shaped articles; an inventory system and method for shipping that allows stocking a minimal number of components while still allowing packaging and shipment of different thickness of disks, and different capacities of disks in a container; components that present universality while still minimizing particulate generation and disk damage and providing ease of assembly. An embodiment of the invention is a universal disk cassette configured for handling different disks of the same diameter but different thicknesses. An embodiment of the invention is a universal top cover configured for a cassettes loaded with different thicknesses of disks, i.e., a cassette loaded with 0.025 inch disks, or the cassette loaded with 0.050 inch disks. The universal top cover is configured for use interchangeably on both. Also the universal top cover configured for use on different capacity disk cassettes, that is a 65 mm disk cassette with a 25 capacity or a 65 mm cassette with a 35 capacity. The universal top cover, according to an embodiment, is configured for use interchangeably on both.

In an embodiment of the invention, a disk shipping system provides an inventory of cassettes for a certain diameter of disks, the cassettes each accommodating more than a single size thickness, e.g., 0.025, 0.0315, 0.040, 0.050, 0.069 inches. The system also provides an inventory of a universal top cover that has a linear or planar top edge disk engagement portion with no discrete locators, such that slight tilt of the thinner disks when seated is accommodated. The container may be vacuum bagged under sufficient vacuum such that the cover and sidewalls of the disk shipper are drawn into the disks fixing them in position.

In an embodiment of the invention, an disk shipping system provides a multiplicity of cassettes for a certain diameter of disks, the multiplicity comprising cassettes of differing capacities, e.g., 25, 35, and 50, and a universal top cover that disk top edge engagement portion that is non-specific with respect to disk capacities. The top cover may, for example, have no discrete locators, such that the top cover may be used with each of 25, 35, and 50 disk capacity loaded cassettes. Additionally, the container may be vacuum bagged sufficient that the cover and sidewalls of the disk shipper are drawn into the disks fixing them in position and fixing the engagement of the top cover and the top edges of the disks.

A method of shipping disks, according to an embodiment of the invention, comprises steps of maintaining an inventory of cassettes that are configured to accommodate different thicknesses of disks, with the cassette configured to limit tilt of the narrowest disks to be accommodated in the cassette such that adjacent disks cannot contact each other, maintaining an inventory of top covers, where each top cover has a universal disk engagement portion that is straight and/or does not have discrete locators for individual disks.

A method of shipping disks, according to an embodiment of the invention, comprises steps of maintaining an inventory of different capacity disk cassettes, maintaining an inventory of a universal top cover, selecting and filing cassettes of different capacities, and utilizing the universal top cover for the different capacity disk cassettes. Utilizing a universal bottom cover for the different capacity cassettes and putting one of said bottom covers on each loaded cassette. The invention, in embodiments, may further provide for vacuum bagging or double vacuum bagging the assembled and loaded disk shipper.

A method of shipping disks, according to an embodiment of the invention, comprises steps of: maintaining an inventory of sets of different capacities of disk cassettes, each set consisting of cassettes of a particular capacity; maintaining a set of universal top covers, the universal top covers each having capability of engaging cassettes with different disk capacities; selecting and filing cassettes of different capacities, and utilizing the universal top cover for the different capacity disk cassettes.

An embodiment of the invention comprises a cassette portion having an open top and an open bottom, a top cover to cover the open top, and a bottom cover to cover the open bottom. The body portion has opposing side walls and opposing end walls. The two side walls each have a vertical planar upper portion and an inwardly converging bottom portion. Said side walls have inwardly facing elongate ribs, also termed teeth, defining slots to hold the disks in a vertically positioned and in a spaced array. Each rib is continuous from adjacent the open top to adjacent the open bottom and each rib has a straight upper vertical portion at the vertical upper portion of the side wall and a converging lower portion at the bottom of the side walls. Each adjacent pair of the vertical straight upper portions of the ribs defines straight upper slot portions. The converging lower portion of each rib follows the convergence of the bottom portion of the sidewalls and defines converging slot portions that curve conforming substantially to the circumference of the disks. The slot is uniformly straight with a slot base surface defined by the inner surface of the sidewall intermediate adjacent vertical ribs. The ribs have a thickening at the lower portion of the vertical straight upper portion; the rib thickening may extend into the converging lower portion of the rib. Correspondingly, the slot narrows intermediate adjacent ribs at the rib thickening. Correspondingly the slot base surface is straight until the slot narrows and then it too narrows.

In an embodiment of the invention, the slots, as defined by the ribs, including thickening of the ribs, are configured to allow use of different thicknesses of disks, e.g., a thicker disk and a narrow disk, the slot configured to allow tilt of the narrower disk, but not enough tilt to contact an oppositely tilted disk in an adjacent slot.

In an embodiment of the invention, a universal top cover that has a linear or planar top edge disk engagement portion, with no discrete locators, such that a slight tilt of the thinner disks when seated is accommodated.

In an embodiment of the invention, a universal top cover that has a linear or planar top edge disk engagement portion, with no discrete locators, such that cassettes of different disk capacities may be utilized with the same universal top cover.

In an embodiment of the invention, a universal top cover that accommodates different thicknesses and different tilts of disks is used with a cooperating cassette. In an embodiment of the invention, discrete locators have disk engagement receivers wide enough to accommodate different thicknesses of disks and all possible tilting of the disks, without obstructing the seating of the top cover onto the cassette. In an embodiment of the invention there are no discrete locators, such that a slight tilt of the thinner disks when seated is accommodated.

The lack of locators in certain embodiments minimizes tooling costs for the molds for the top covers.

An advantage and feature of certain embodiments is that the universal cover does not utilize separate retainers/cushions that have been used in the past to contact the top edge of each disk to help hold the disk in place. This also allows using the same shipper container and cover for all thickness of disks, and makes the top cover easier to manufacture and less expensive. The disk engagement portion in certain embodiments of the invention is part of the wall of the top cover, or may be a pair of thin integral blade extending the length of array of disks to be engaged.

An advantage of an embodiment of the present invention is the shape of the disk holding rib members. These rib members have two distinct thicknesses along the length of the member. At a point near the bottom of the member, the rib member thickness is increased to an optimum thickness to allow insertion of a disk with a thickness of 0.025 inches including disk thicknesses up to and including a disk with a thickness of 0.050 inches and support these disks so that they are vertical with respect to the bottom of the container and limit tilt sufficiently to prevent disk to disk contact.

Another advantage of an embodiment of the present invention is to provide an improved disk cassette which stabilizes the disks within the disk cassette so as to reduce the occurrence of abrasion therebetween without the need for the cushion/retainer members in the top cover.

Another feature and advantage of embodiments of the invention is that the advantages of vacuum bagging of disk shippers is optimally utilized to secure tilted disks in a universal cassette eliminating or minimizing movement of the disks during shipping. Applicants have discovered that such a securement permits a particularly sized universal cassette to be utilized with disks of different thicknesses, which was not heretofore practical or, to applicants' understanding, known.

Another feature and advantage of embodiments of the invention is that the advantages of vacuum bagging of disk shippers is optimally utilized to secure tilted disks in conjunction with a universal top cover and a cassette eliminating or minimizing movement of the disks during shipping. Applicants have discovered that such a securement permits use of the universal top cover that does not have discrete locators for individual disks, said use of and configuration of the universal top cover without discrete locators was not heretofore practical or, to applicants understanding, known.

Another feature and advantage of embodiments of the invention is that the advantages of vacuum bagging of disk shippers is optimally utilized to secure tilted disks in conjunction with a top cover and a cassette eliminating or minimizing movement of the disks during shipping. The invention includes utilizing a top cover that does not engage the top of the disks and utilizing vacuum bagging that pulls in the sidewalls of the cassette to lock the disks in the shipper without downward constraint to the disks being provided by the top cover. The sides of the cassette may be pulled in such that there is a tilt of the upper portions of the sidewalls. In certain embodiments the tilt may be 1 to 2 degrees from vertical, in other embodiments 2 to 3 degrees from vertical, in other embodiments more than 0.5 degrees, in some embodiments, more than 3 degrees. In such a conditions the top opening may be reduced to a width that is less than the width of the diameter of the disks thus locking them in position. Thus a top cover may be utilized in certain embodiments where is does not contact the individual disks. Use of such a non engagement universal top cover was not heretofore practical or, to applicants understanding, known. In other embodiments, the top cover only may be deflected sufficiently by vacuum bagging to engage and fix the disks in position for shipping.

Another feature and advantage of embodiments of the invention is that the advantages of vacuum bagging of disk shippers is optimally utilized for securing disks whilst allowing use of a universal cassette that can accommodate different thicknesses of disks, different cassettes of different capacities, and a universal top cover that can accommodate different quantities of disks and different thicknesses of disks. Applicants have discovered that such a securement permits use of a universal top cover that does not have discrete locators for individual disks, said use of and configuration of the universal top cover without discrete locators was not heretofore practical or, to applicants understanding, known.

Another advantage of embodiments of the present invention is to provide an improved disk cassette which minimizes the area of contact between each disk and the disk cassette so as to reduce the opportunity for abrasion.

Another advantage of embodiments of the present invention is to provide an improved disk cassette which helps prevent the generation of particulation which can contaminate or damage the memory media on data storage disks, or contaminate or damage other disk-shaped articles.

Another advantage of embodiments of the present invention is to provide an improved disk cassette with improved disk stabilization to remove the need for cushion/retainer mechanisms in the top cover.

Another advantage of embodiments of the present invention is to provide an improved disk cassette where disk tilt is tolerated before the top cover is installed, during installation of the top cover, and after the top cover is installed. Such capability allows substantial simplicity in the design of the disk engaging portions of the top cover. For example a panelar strip that is part of the top cover wall portion may be used. Alternatively or additionally, a vertical strip integral with the top cover wall portion may be used.

Another advantage of embodiments of the present invention is to provide an improved disk cassette which requires a minimal amount of material for formation by removing the cushion/retainer mechanism from the top cover, thereby decreasing the cost of manufacture and cycle time.

Another advantage of embodiments of the present invention is to provide an improved top cover which can be used on different capacity cassettes and with different thicknesses of disks, thereby minimizing tooling needed for varying combinations of cassette capacities and disk thicknesses.

DETAILED DESCRIPTION OF THE INVENTION

Figure 1:
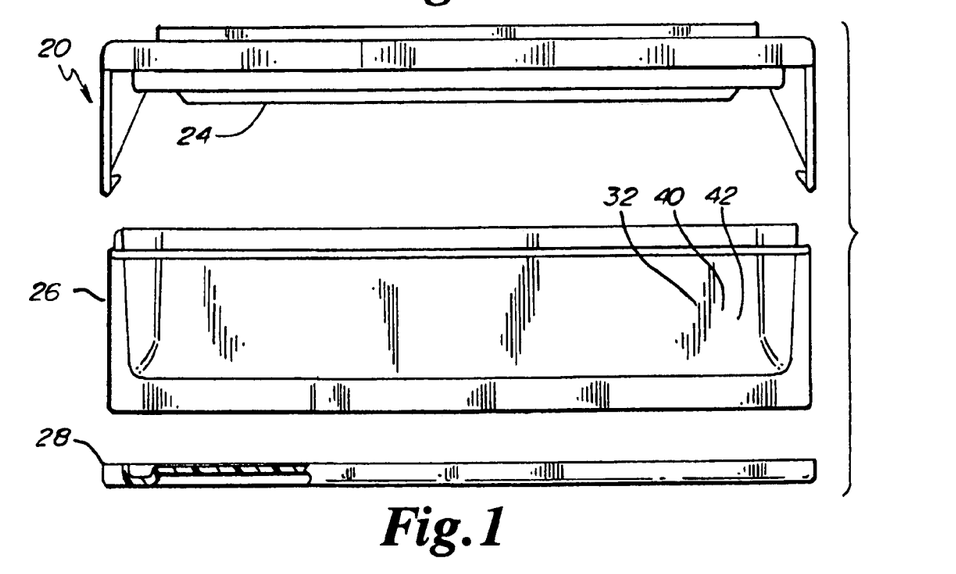
FIG. 1 is an exploded elevational view of a universal three piece disk shipper with a cassette, a top cover, and a bottom cover in accord with embodiments of the invention.

FIG. 1 is an elevational view of a three piece disk shipper 20 consisting of a top cover 22, with disk engagement portion 24 configured as anti-clocking ribs, a cassette 26, and a bottom cover 28.

Figure 2:
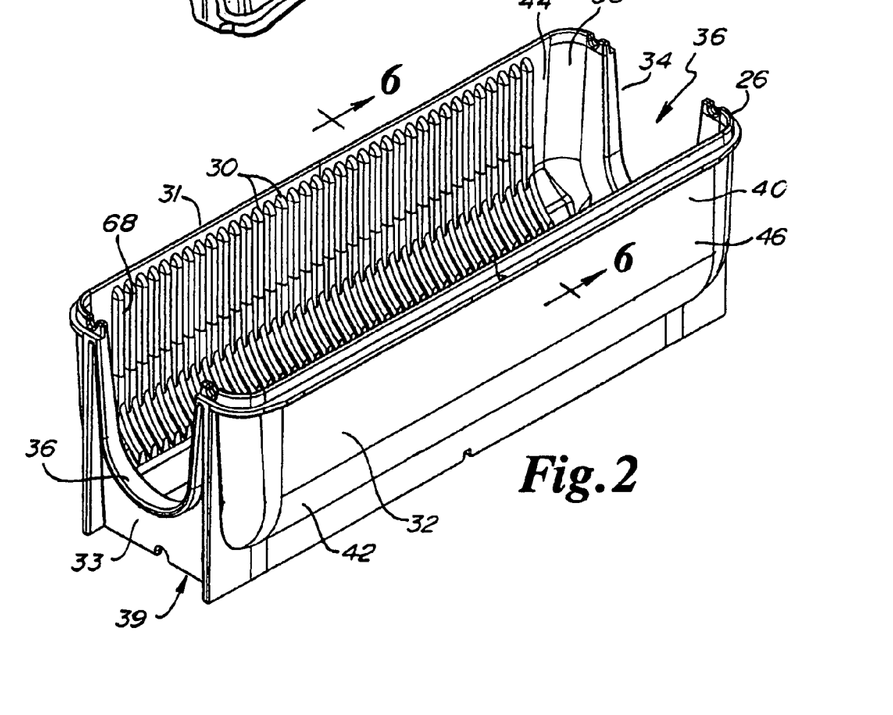
FIG. 2 is a perspective view of a universal cassette in accord with embodiments of the invention.

FIG. 2 shows a perspective view of a universal disk cassette 26 including the present invention showing the improved ribs 30 that include two separate thicknesses to hold the disks in place. The cassette has opposing side walls 31, 32, end walls 33, 34, each with a U-shaped opening 36. The cassette has an open top 38 and an open bottom 39. The sidewalls have an upper vertical planar portion 40 and a lower inwardly converging portion 42, an inwardly facing inside surface 44 and an exteriorly facing surface 46.

Figures 4, 5:
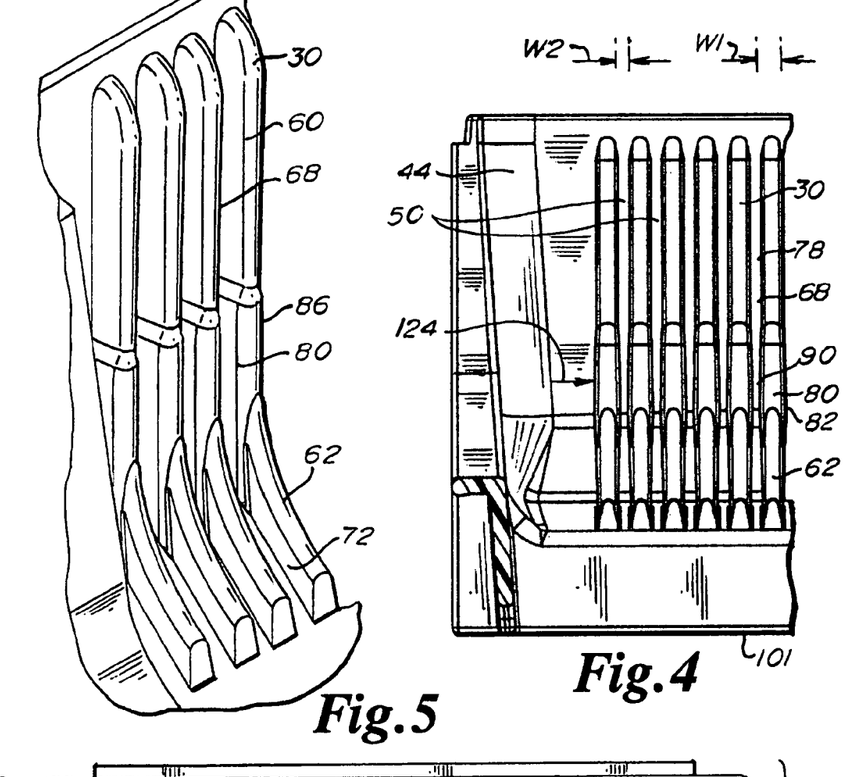
FIG. 4 is an elevational view of the interior ribs of a cassette with opposite sidewall removed for clarity.
FIG. 5 is a perspective view of ribs defining slots in accord with embodiments of the invention herein.
Figure 6:
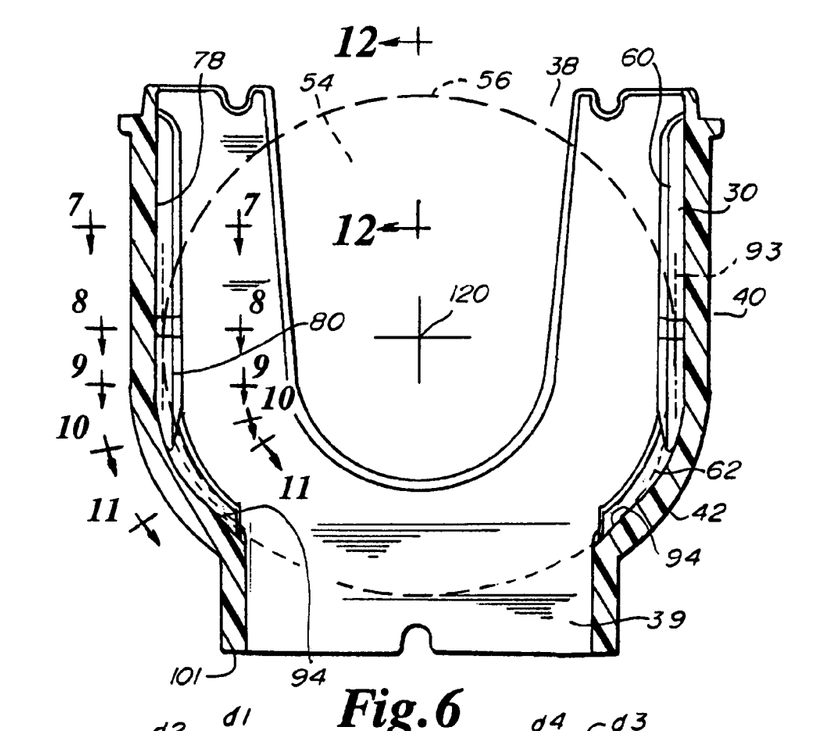
FIG. 6 is a cross sectional view taken at line 6-6 of FIG. 2.
Figure 7:
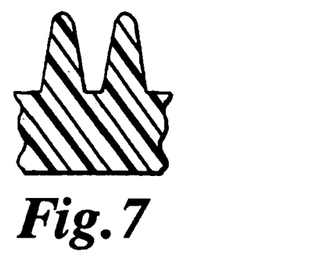
FIGS. 7-11 are rib cross sections, in accord with embodiments of the invention, taken at the corresponding lines of FIG. 6.
Figure 8:
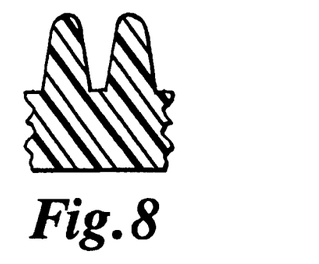
Figure 9:
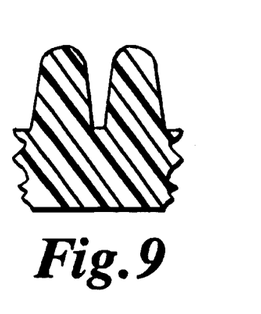
Figure 10:
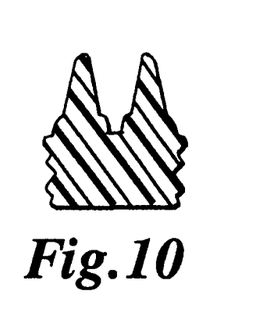
Figure 11:
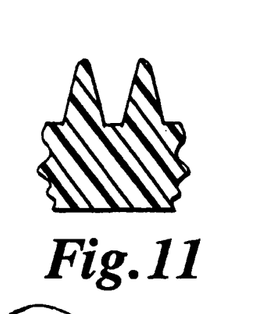

Referring to FIGS. 4-6, further details of the side walls and inwardly facing elongate ribs 30 are illustrated. The ribs 30 define slots 50 for receiving and retaining the disks. A disk 54 is illustrated by dashed lines in FIG. 6 and has a peripheral edge 56. Each rib 30 is continuous from adjacent the open top 38 to adjacent the open bottom 39. Each rib has a straight upper vertical portion 60 at the vertical upper portion of the side wall and a converging lower portion 62 at the lower portion of the side walls. Each adjacent pair of the vertical straight upper portions of the ribs define straight upper slot portions 68. The converging lower portion 62 of each rib follows the convergence of the bottom portion of the sidewalls and defines converging slot portions 72 that curve conforming substantially to the circumference of the disks. The upper slot portion 68 is uniformly straight with a slot base surface 78 defined by the inner surface of the sidewall intermediate adjacent vertical ribs. The ribs have a thickening 80 at a thickened portion 82 at a lower portion 86 of the vertical straight upper portion, the rib thickening may extend into the converging lower portion 62 of the rib. Correspondingly, the slot narrows intermediate adjacent ribs at the rib thickening at the narrowed slot base surface 90.

The outer edge 56 of the disk 54 seats on arcuate seating portions 94, also termed radial seats, which include the lowest portion of the slot base surface. In normal conditions, the disk is forwardly and rearward constrained, that is in the lengthwise direction of the cassette, by the ribs but does not otherwise contact the slot base surface except at the radial seats 94. Under vacuum bagging conditions, the side walls of a loaded cassette may be deflected inwardly to the position 93 illustrated by the dashed line to contact and secure the disk in the cassette. Similarly, engagement of the top cover with the top edge of the disks may be assured during vacuum bagging, securing the disks in place and substantially or totally preventing any movement with respect to the container. In certain embodiments, the deflection of the sidewalls of the cassette inwardly by vacuum bagging is sufficient to fix the disks in place in the slots, precluding any appreciable movement during shipment. In such embodiments, the engagement or contact of the top cover with the top edges of the disks may be eliminated.

Figure 3:
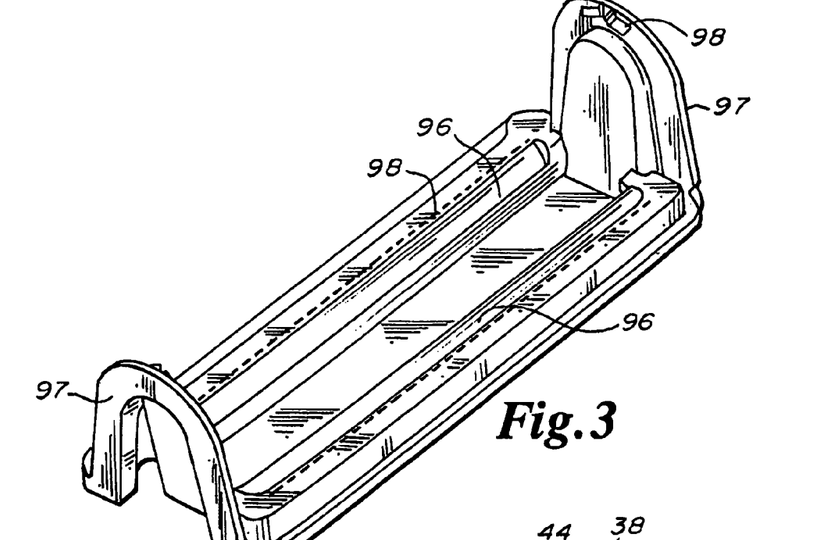
FIG. 3 is a perspective view of the underside of a universal top cover in accord with embodiments of the invention.

Referring to FIG. 3, a universal top cover is illustrated. The top cover has a panelar top wall 95 and U-shaped end pieces 97 for closing the U-shaped openings on the cassette, and latches portions 98 for securing the top cover to the cassette. Unlike conventional top covers for three piece disk shippers, this cover does not have teeth, or locators for discrete engagement of individual disks. Rather continuous disk engagement surfaces 96 are provided that may be part of the panelar top wall. Alternatively or additionally strips or ribs of polymer, preferably integral with the panelar top wall, may extend downwardly from the downwardly facing surface 99 at the locations designated with the dashed lines. FIG. 1 illustrates such a rib 24.

Figure 12:
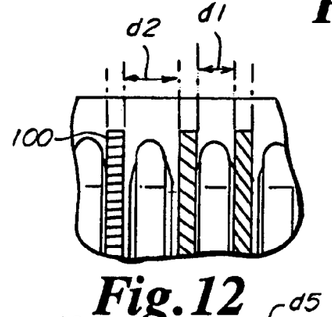
FIG. 12 is an enlarged view of the top of the disk support member with a 50 mil disk installed taken at line 12-12 of FIG. 6.
Figure 13:
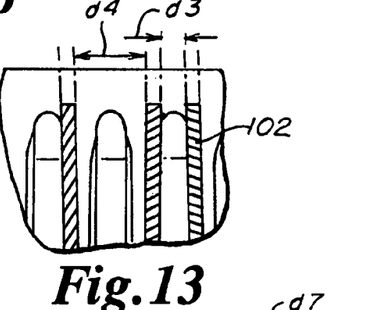
FIG. 13 is an enlarged view of the top of the disk support member with a 40 mil disk installed taken at line 12-12 of FIG. 6.
Figure 14:
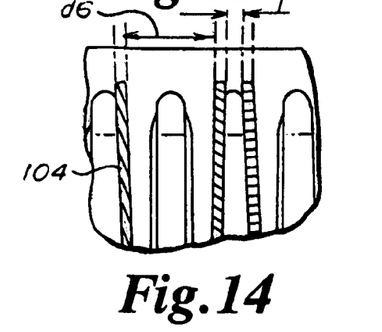
FIG. 14 is an enlarged view of the top of the disk support member with a 31.5 mil disk installed taken at line 12-12 of FIG. 6.
Figure 15:
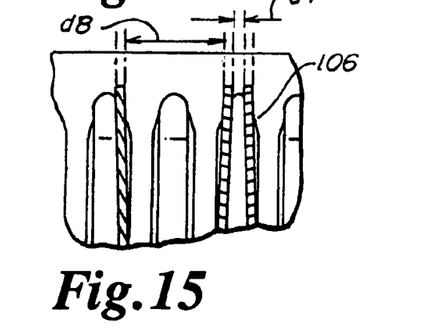
FIG. 15 is an enlarged view of the top of the disk support member with a 25 mil disk installed taken at line 12-12 of FIG. 6.

FIGS. 12-15 are detailed views of the top of the disk support members with various sized disks installed. These illustrations show exemplary separation between adjacently installed disks in a cassette configured in accord with the invention herein with thickening of ribs 30 at the lower portion of each rib 30. FIG. 12 shows an exemplary separation distance between adjacently installed disks 100 that are 0.050 inches thick. The minimum separation distance d1 between adjacent disks 100 is 0.100 inches and the maximum separation d2 between adjacent disks is 0.105 inches. Coincidentally, the 0.050 inches thick disk is at an angle of 90.4° with respect to the bottom edge 101 of the cassette. FIG. 13 shows the separation distance between adjacently installed disks 102 that are 0.040 inches thick. The minimum separation distance d3 between adjacently installed disks 102 is 0.071 inches and the maximum separation d4 is 0.203 inches. The 0.040 inches thick disk 102 is at an angle of 91.1° with respect to the bottom edge 101 of the cassette. FIG. 14 shows the separation distance between adjacently installed disks 104 that are 0.0315 inches thick. The minimum separation distance d5 between adjacent disks 104 is 0.047 inches and the maximum separation d6 between adjacent disks is 0.244 inches. The 0.0315 inches thick disk is at an angle of 91.6° with respect to the bottom edge 101 of the cassette. FIG. 15 shows the separation distance between adjacently installed disks 106 that are 0.025 inches thick. The minimum separation distance d7 between adjacent disks 106 is 0.029 inches and the maximum separation d8 between adjacent disks is 0.275 inches. The 0.025 inches thick disk is at an angle of 92° with respect to the bottom edge 101 of the cassette. In particular embodiments, the maximum tilt of each of adjacent disks will be less that 2° from vertical. In particular embodiments, the maximum tilt of each of adjacent disks will be less that 3° from vertical. In particular embodiments, the maximum tilt of each of adjacent disks will be equal to or less that 1.6° from vertical. In each of the above embodiments, the adjacent disks when tilted towards each other do not make contact with the other, there is separation.

FIGS. 4, 5 and 6 are partial views of the side of the cassette showing the area of the disk support members and the area of the disk support that is increased in thickness. Each tooth in the cassette has a complicated profile which may include a width w1 at the top of the rib 30 that is 0.117 inches, for example. The tooth profile may then be blended to a thickness of 0.130 inches at the horizontal elevation 124 corresponding to the center 120 of seated disks, see FIG. 6. The thickening may be referred to as a disk tightener. The disk slot width w2 between the two teeth at this location is 0.048 inches. As shown in FIG. 15, the disk tilt for all sizes of disks is acceptable in that even with the thinnest disk; 0.025 inches thick, adjacent disks do not touch each other. This accomplishes the requirement of eliminating contact between adjacent disks.

FIGS. 7-11 illustrate exemplary variations in the rib profile at different points in the rib as designated in FIG. 6. The rib is illustrated as thickest with the slot being the narrowest at line 124.

Figure 16:
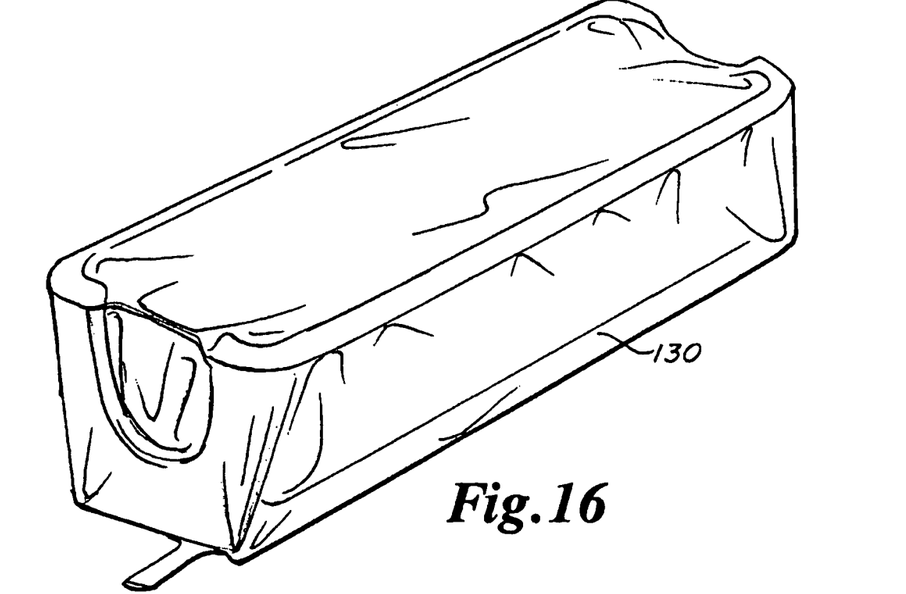
FIG. 16 is a perspective view of a vacuum bagged shipper in accord with embodiments of the invention.

Referring to FIG. 16, utilizing the universal cassette and universal top cover with vacuum bag 130 provides a securement of the disks within the cassette to virtually eliminate movement, rattle, and rotation during shipping. Such bagging may allow the sidewalls of the cassette and the top cover to securely constrain the disks without damage. Moreover, the improvements herein further provide flexibility in using the same cassette and top cover for different thicknesses of disks. The improvements provide for more economical manufacture of the disk shippers.

In an embodiment of the invention the cassettes described herein, and the top covers described herein may be utilized in a disk shipping system providing significant advantages over the current high multiple component inventories currently required for shipping a different thicknesses of a particular sized disk. Such new system may comprise providing an inventory of cassettes sized for a specific diameter of disks, the cassettes each having slots that will accommodate at least two of 0.025, 0.0315, 0.040, 0.050 inch thick disks, as well as providing an inventory of a universal top cover that has a top edge disk engagement portion without discrete locators, or that can accommodate different thicknesses of disks, providing an inventory of bottom covers; and providing an inventory of vacuum bags for sealing the assembled and loaded cassettes.

In an embodiment of the invention, a disk shipping method comprises providing an inventory of cassettes sized for a specific diameter of disks, the cassettes each having slots that will accommodate at least two of 0.025, 0.0315, 0.040, 0.050 inch thick disks; filling one of said cassettes with a load of disks; attaching a top cover that does not have discrete locators sized to constrain any of the disks in the cassette; attaching a bottom cover to the cassette; and vacuum bagging the loaded cassette with top cover and bottom cover attached under sufficient vacuum to secure the disks in place in the cassette. The container is preferably vacuum bagged under sufficient vacuum such that the cover and sidewalls of the disk shipper are drawn into the disks fixing them in position. The container may be secondarily vacuum bagged for added protection.

The components herein may be conventionally formed from injection molded polymers.

U.S. Pat. Nos. 6,902,059, 4,557,382 and 5,253,755 are incorporated herein by reference for disclosing conventional features of three piece disk shippers, some elements of which are applicable to the configurations and inventions disclosed herein.

The embodiments above are intended to be illustrative and not limiting.

Additional embodiments are within the claims. Although the present invention has been described with reference to particular embodiments, workers skilled in the art will recognize that changes may be made in form and detail without departing from the spirit and scope of the invention.

What is claimed is:

1. A universal disk shipper for shipping memory disks, the shipper comprising a cassette having opposing side walls and opposing end walls, an open top, and an open bottom,
a top cover to cover the open top,
a bottom cover to cover the bottom,
the opposing side walls of the cassette each having a vertical upper portion and an inwardly converging bottom portion, said sidewalls having a plurality of inwardly facing elongate vertical ribs with adjacent ribs defining slots to hold memory disks of a variety of thicknesses that are vertically positioned or near vertically positioned and in a spaced array, each rib being continuous from adjacent to the open top to adjacent the open bottom, each rib having a straight upper portion at the vertical upper portion of the side wall and a converging lower portion at the converging bottom portion of the side walls, in cross-section each rib having a thickened portion on the straight upper portion that is nearer the open bottom than the open top, the thickened portions narrowing the slots defined by adjacent ribs, the thickened portion not extending to the converging lower portion of each rib adjacent the open bottom.

2. The disk shipper of claim 1 wherein the ribs are configured for defining slots for receiving and seating 0.025 inch thick disks and 0.050 inch thick disks such that 0.025 inch disks placed in a pair of adjacent slots do not contact each other when each are seated in their respective slots and tilted toward the other of the pair of adjacent slots.

3. The disk shipper of claim 1 wherein the top cover has an engagement portion that contacts each of the disks in the cassette when said disks are seated therein, the top cover not having discrete locators for each disk.

4. The disk shipper of claim 1 in combination with a plurality of disks with a disk positioned in each slot, and wherein the cassette is configured to seat each disk only at an arcuate seating portion adjacent the bottom on each converging sidewall portion.

5. The disk shipper of claim 1, further comprising a plurality of disks filling the cassette, and wherein the top cover is attached to the cassette and the bottom cover is attached to the cassette, and further comprising a vacuum bag encompassing the disk shipper with sufficient vacuum to deflect the sidewalls of the cassette inwardly, whereby the disks are secured in place and will not appreciably move with respect to the cassette during shipping.

6. The disk shipper of claim 1, further comprising a plurality of disks filling the cassette, and wherein the top cover is attached to the cassette and the bottom cover is attached to the cassette, and further comprising a vacuum bag encompassing the disk shipper with sufficient vacuum to deflect the sidewalls of the cassette inwardly and to pull the top cover inwardly where by each of the disks is engaged with the top cover whereby the disks are secured in place to prevent movement during shipping.

7. The disk shipper of claim 1 wherein there are two engagement portions of the top cover running parallel with each other and each is planar and continuous the entire length of the respective engagement portion.

8. A disk shipping system comprising:
a plurality of cassettes sized for a specific diameter of disks, the cassettes each having a plurality of ribs each with opposing end portions, the plurality of ribs defining a plurality of slots that will accommodate at least two of 0.025, 0.0315, 0.040, 0.050, 0.069 inch thick disks, and wherein each rib has a thickening at a mid portion and not at the opposing end portions thereby providing a disk tightener in each slot;
a plurality of universal top covers that each have a top edge disk engagement portion and do not have discrete locators for individual disks;
a plurality of bottom covers; and a plurality of vacuum bags for sealing assembled and loaded cassettes;

wherein each cassette has an open bottom, an open top, and a pair of opposing side walls, each side wall having a vertical upper portion and a converging bottom portion, each cassette further having a plurality of slots defined by a plurality of ribs on the pair of opposing side walls, and wherein each rib has a straight upper portion at the vertical upper portion of the side wall and a converging lower portion at the converging bottom portion of the side walls, each thickening at the mid portion being nearer the open bottom than the open top.

9. The disk shipping system of claim 8 wherein each cassette is configured to accommodate loads of at least two different disk thicknesses, a thinner thickness and a thicker thickness, and the slots are configured to allow the disk loads of the thinner thickness to be tilted in the slots and not contact one another.

10. The disk shipping system of claim 8, in combination with a plurality of disks with a disk positioned in each slot, and wherein each cassette is configured to seat each disk only at an arcuate seating portion adjacent the open bottom on the converging bottom portion of each side wall, wherein the cassette side walls are not deflected inwardly.

11. The disk shipper system of claim 8, further comprising a plurality of disks filling each cassette, and wherein the top covers are attached to the cassettes and the bottom covers are attached to the cassettes, the vacuum bags encompassing the cassettes with sufficient vacuum to deflect the side walls of the cassettes inwardly, whereby the disks are secured in place and will not appreciably move with respect to the cassettes during shipping.

12. The disk shipping system of claim 11, wherein the vacuum bags encompass cassettes with sufficient vacuum to pull the top covers inwardly whereby the disks are engaged with the top covers such that the disks are secured in place to prevent movement during shipping.

13. The disk shipper of claim 1, wherein disks positioned in the slots of the cassette are configured to seat the disks only at an arcuate seating portion at a lowest region of the slots when not vacuum bagged and when the top cover and bottom cover are engaged, and when the shipper is vacuum bagged the vertical upper portions of the sidewalls are pulled inwardly and contact the outer periphery of the disks at a slot base surface thereby laterally fixing the position of the disks.

* * * * *